Jan. 27, 1925.

L. W. TYLER 1,524,324

DRAG SHOE

Filed June 22, 1923

Inventor

L. W. Tyler

By Lloyd W. Batch
Attorney

Patented Jan. 27, 1925.

1,524,324

UNITED STATES PATENT OFFICE.

LORING WHEELER TYLER, OF PULASKI, MICHIGAN.

DRAG SHOE.

Application filed June 22, 1923. Serial No. 647,071.

*To all whom it may concern:*

Be it known that I, LORING WHEELER TYLER, of Pulaski, county of Jackson and State of Michigan, a citizen of the United States, have invented certain new and useful Improvements in Drag Shoes, of which the following is a specification.

My invention relates to an improvement in drag shoes and particularly to a device of this character intended for use in conjunction with a drag, harrow or like agricultural implement and prevent clogging between the sections.

An object of my invention is to provide a drag shoe structure which can be fitted to be supported and drawn by the implement frame and which has a drag portion resting by gravity upon the ground to prevent trash, stones and the like from jamming and clogging between the sections of the implement.

A further object resides in so constructing the parts that the drag shoe can be constructed and sold as an accessory and can be applied by the individual user, the drag shoe to be fitted in position upon the implement to accomplish the most efficient results.

With the above and other objects in view, my invention includes certain novel features of construction and combination of parts which will now be set forth in connection with the drawing.

Figure 1:
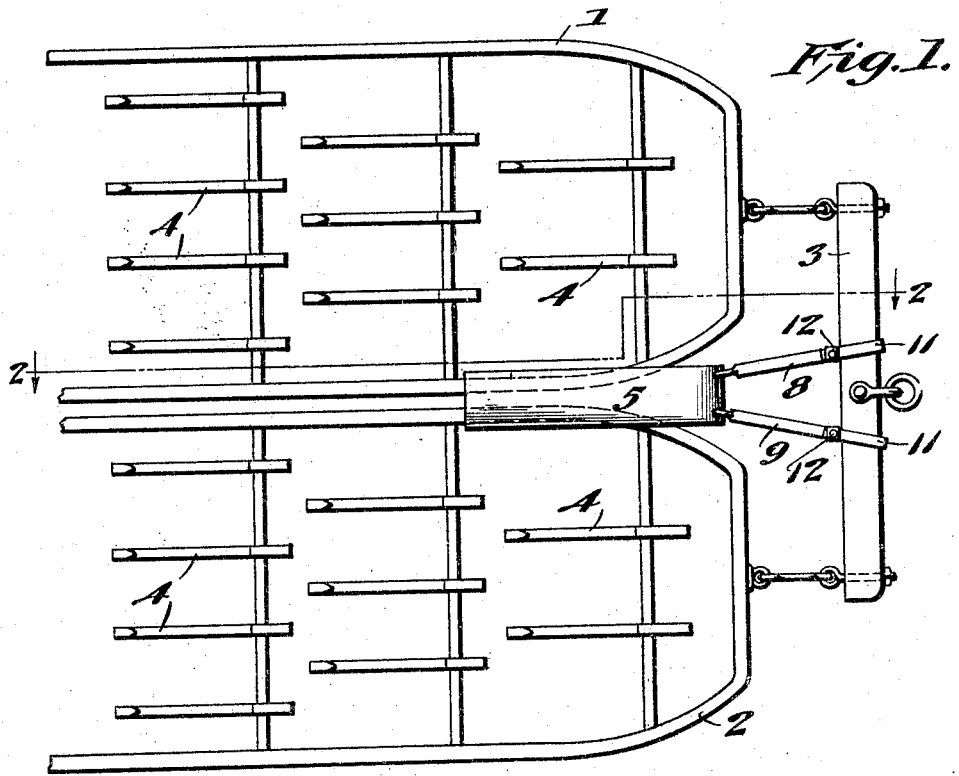
Figure 1 is a bottom plan view of a harrow, showing the fitting and connection of my improved drag shoe when in use.
Figure 2:
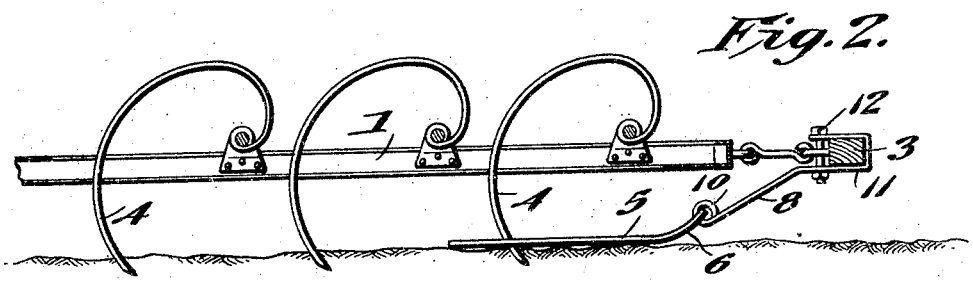
Fig. 2 is a longitudinal section view to better illustrate the construction of the drag shoe and the fitting between the sections of a drag.
Figure 3:
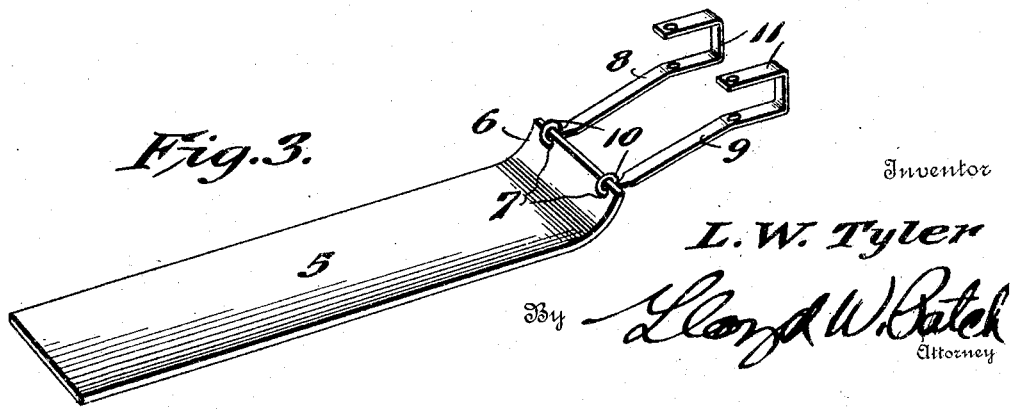
Fig. 3 is a perspective view of the drag shoe.

It is customary to provide some sort of cleaner or shoe between the sections of a drag, harrow or like agricultural implement, which shoe will clean the path and will prevent damage to the teeth through striking stones or other obstructions. However, it has been found that such shoes are not satisfactory, as trash, stones, and the like will clog or jam thereagainst, and in consequence large quantities of dirt and trash will be moved ahead of the drag or harrow. This collection of extraneous matter must be removed, and it is necessary for the operator to stop and clean the teeth periodically.

My invention contemplates the elimination of the collection of rubbish and the like through the provision of a loosely mounted drag shoe which will travel or drag upon the ground and will keep stones, sod, roots, sticks and the like from getting between the sections of the drag or harrow to clog the same. In the present instance, I have shown my improvement applied to a spring toothed drag or harrow, and in this instance the frame portions of the drag are illustrated at 1 and 2, these being connected with a hitch-bar 3. The teeth are shown at 4, and it will be appreciated that it is immaterial whether these are spring, prong, shovel or other types of teeth.

My drag shoe consists of a shoe member 5, preferably made of bar iron or other metal and approximately five inches wide by twenty-four inches long. This shoe member has the forward end 6 thereof turned up to give a runner or skid form, and hitch openings 7 are provided through this attachment end. The draw-bars 8 and 9 are connected in these hitch openings 7, these draw-bars having rings 10 at one extremity to hitch loosely within openings 7, and being bent at their remaining ends to provide the open loops 11. Securing bolts 12 are connected between the ends of the open loops and the body portions of the draw-bars.

In the use of my improved drag shoe, the open loops 11 of the draw-bars 8 and 9 are caught around portions of the frames 1 and 2, or around the hitch bar 3, or other convenient portions of the drag or harrow structure. Bolts 12 are then inserted in place to retain this connection of the draw-bars, it being preferable that the connection on the drag or harrow structure be loose to permit swinging movement of the draw-bars 8 and 9. With this connection and mounting, the shoe 5 is hitched to the structure of the drag or harrow and is positioned to trail upon the ground. As the forward end of the shoe 5 is turned up, this shoe will ride over stones, trash and the like and will press the same down to prevent clogging between the teeth of the implement.

While in the foregoing, I have shown and described only one particular embodiment of my invention and I have illustrated only one manner of mounting, it will be appreciated that changes can be made in the form and arrangement of the parts for particular adaptations without departing from the spirit and scope of my invention.

What I claim is:

1. A drag shoe for use upon land drags comprising a weighted shoe member and a draw rod by which the shoe member is loosely connected with and hitched to the drag structure to be drawn over the ground.

2. A drag shoe for use in conjunction with land drags comprising a weighted shoe member having its forward end made runner-shaped, and draw-bars loosely connected with said shoe at its forward end and adapted to be connected with the structure of the drag to draw the drag shoe over the ground.

3. A drag shoe comprising an elongated metallic shoe having its forward end upturned and provided with hitch openings, a pair of draw bars having their ends looped through the openings to loosely connect with the shoe and having their remaining ends bent to provide open loops, and bolts to close the open loops of the draw-bars.

4. In combination with a drag or harrow, an elongated weighted drag shoe having its forward end upturned and provided with hitch openings, a pair of draw-bars looped through said openings to loosely connect with the shoe, said draw-bars having their remaining ends bent to provide open loops to be fitted around portions of the drag structure, and bolts to connect the open loops on the drag structure.

In testimony whereof I hereunto affix my signature.

LORING WHEELER TYLER.